Jan. 27, 1970  A. ZURCHER  3,491,654
PISTON AND CYLINDER ARRANGEMENT FOR A RECIPROCATING MACHINE
Filed June 17, 1968  5 Sheets-Sheet 1

Inventor:
ALFRED ZÜRCHER
BY
Kenyon & Kenyon
ATTORNEYS

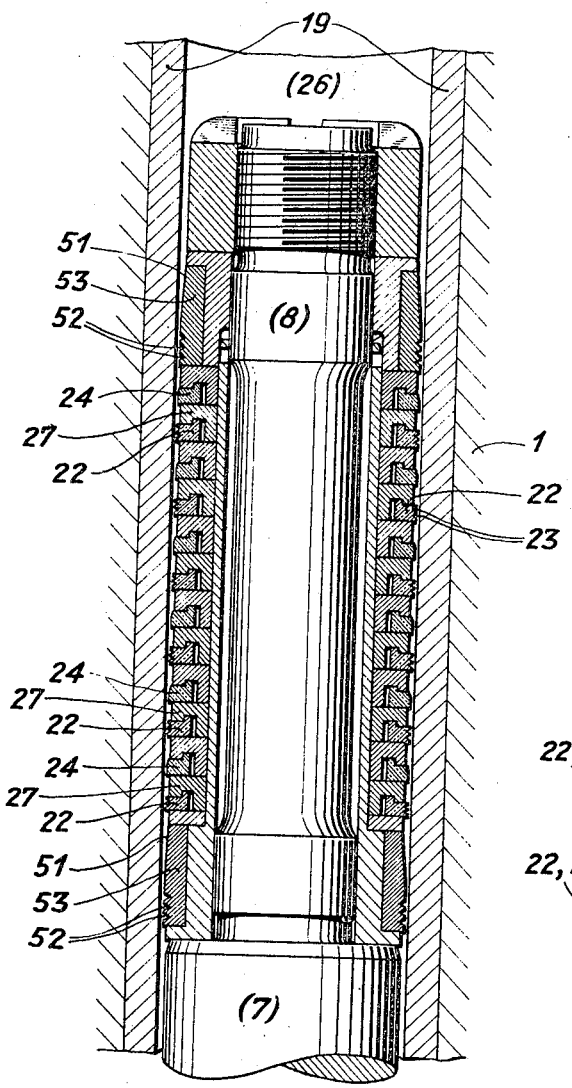

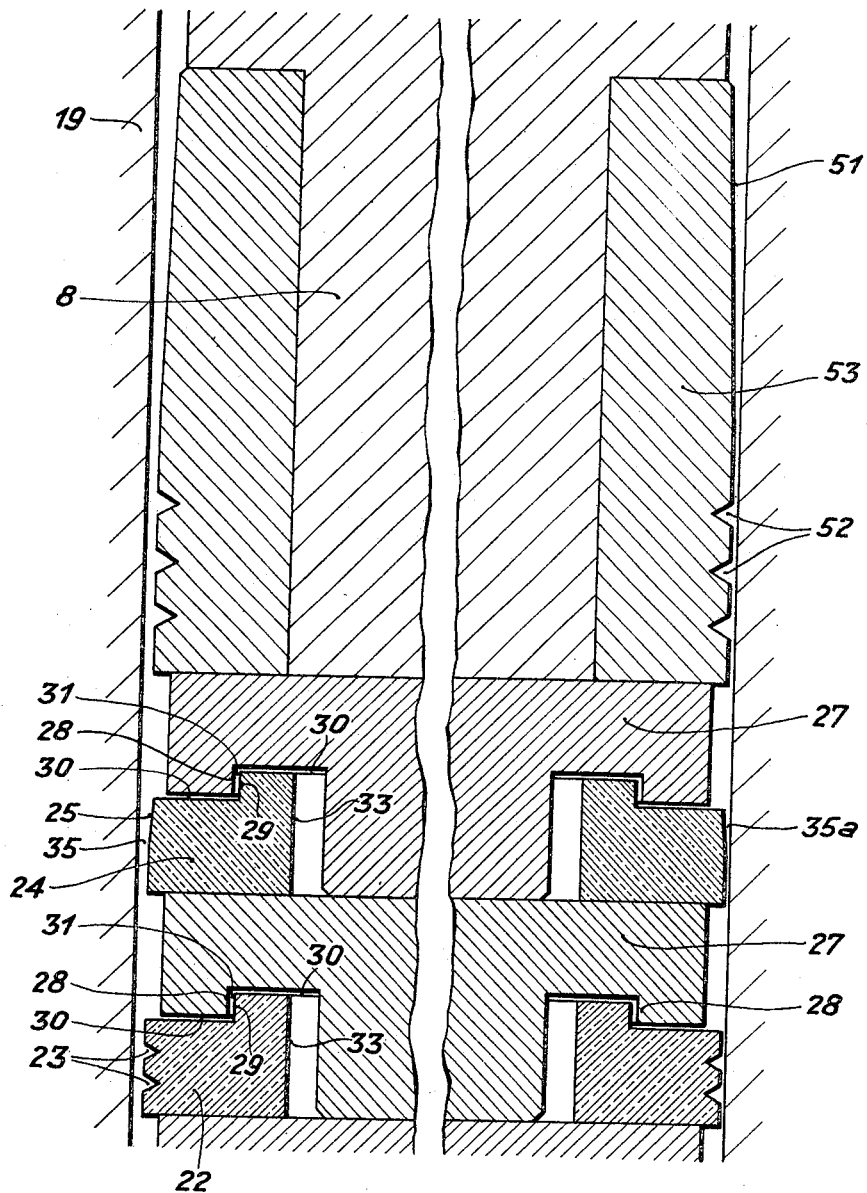

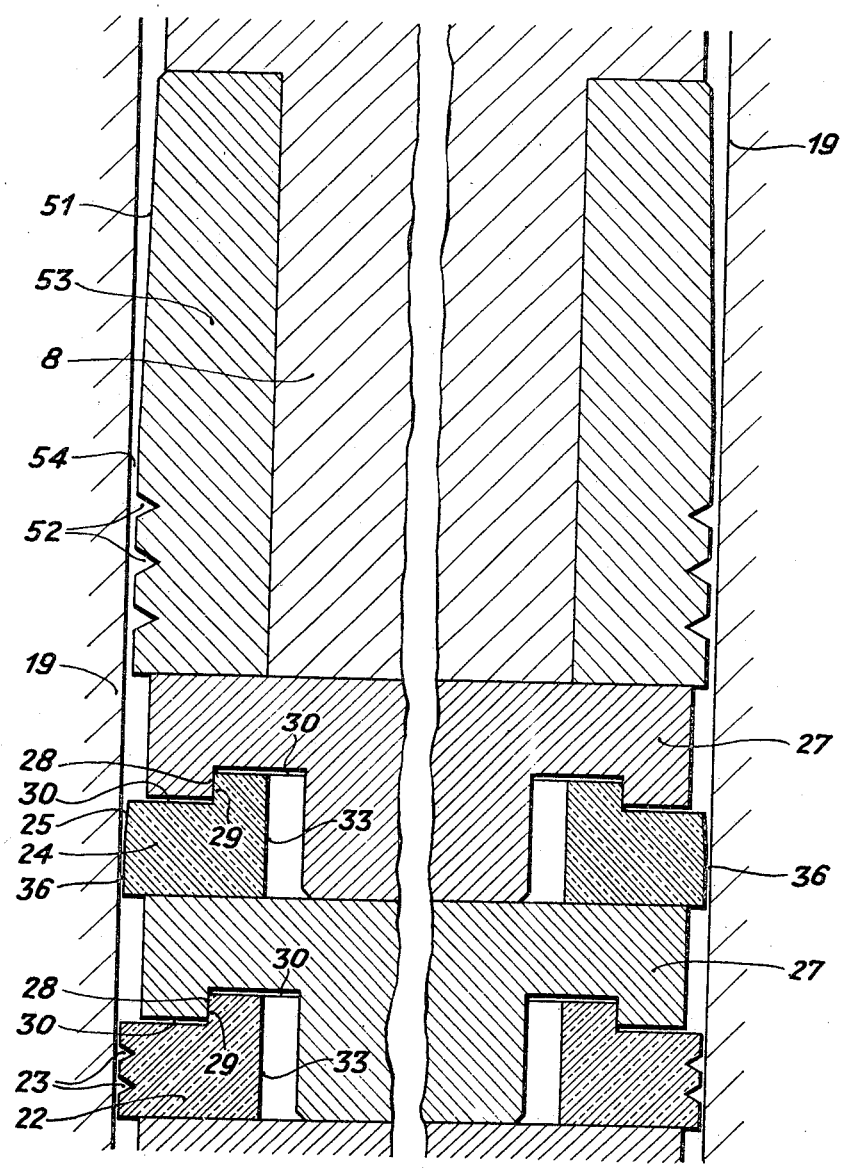

United States Patent Office 3,491,654
Patented Jan. 27, 1970

3,491,654
PISTON AND CYLINDER ARRANGEMENT FOR A RECIPROCATING MACHINE
Alfred Zurcher, Winterthur, Switzerland, assignor to Sulzer Brothers Ltd., Winterthur, Switzerland, a corporation of Switzerland
Filed June 17, 1968, Ser. No. 737,551
Claims priority, application Switzerland, July 7, 1967, 9,728/67
Int. Cl. F01b 31/28, 31/00
U.S. Cl. 92—162           10 Claims

ABSTRACT OF THE DISCLOSURE

The piston is spaced with a minimum clearance from the internal walls of the cylinder. The sealing rings are slotted and the tendency of the rings to expand during operating is restrained by mating closed ring elements on the piston. The sealing rings can have conical surfaces inclined towards the pressure space to facilitate centering of the piston during operation.

---

This invention relates to a reciprocating machine. More particularly, this invention relates to a reciprocating piston assembly of a compresser.

Reciprocating machines have been known wherein a piston of a crank mechanism reciprocates within a cylinder while being spaced from the walls of the cylinder, for example, as in a compressor for conveying gas. Usually, the piston of such machines has sealing labyrinths at the periphery which are in the form of non-adjustable peripheral grooves and further has been spaced with a relatively large clearance from the internal walls of the cylinder. The large clearance has been required in order to avoid seizing up of the piston in the cylinder under heat expansion as often such would otherwise result in a forced fracture in the cooperating crank mechanism. Also, the piston has been mounted on the crank mechanism at a point outside the cylinder so that during operation the periphery of the piston or the peripheral sealing members on the piston do not contact the cylinder or at most contact the cylinder only in emergencies as a result of accidental and unwanted deviations.

However, because of the required large clearances between the surface of the pistons and cylinders of these reciprocating machines, there has frequently been detrimental leakage of the material being compressed between these surfaces. Further such leakages have usually been bothersome where light gases and/or high compression ratios have been used.

Accordingly, it is an object of the invention to reduce the clearance required between a piston and a cylinder of a reciprocating machine.

It is another object of the invention to reduce the amount of leakage between a cylinder and a piston reciprocally mounted in spaced relation within the cylinder especially in the case of light gases such as hydrogen and helium and at high compression ratios.

Briefly, the invention provides a means of spacing a reciprocally mounted piston from a surrounding wall of a cylinder in a manner whereby the clearance between the piston and cylinder is reduced to a minimum without any risk of seizing up of the piston or abrasion of the piston or the sealing rings on the piston periphery. This means includes the mounting of at least one slotted or gapped sealing ring in the manner of a piston ring of an internal combustion engine about the piston in spaced relation to the cylinder in a manner to inhibit the tendency of the sealing ring to widen radially in operation under the force of the pressure in a compression space within the cylinder. The mounting of the sealing ring is such that even when the pressure in the compression space is relatively high, the sealing ring makes substantially no contact with the cylinder.

In one embodiment of the invention, the sealing ring is provided with a shoulder which engages with a mating shoulder on the piston disposed radially outwardly of the shoulder on the sealing ring. The mating shoulder on the piston is of the same diameter or a greater diameter than the shoulder of the sealing ring. Further, the mating shoulder is formed on the piston or, alternatively, on a closed ring element mounted on the piston.

In another embodiment of the invention, a number of the slotted sealing rings are provided with at least some degree of conicity on the peripheral surface in order to ensure uniform guidance as well as sealing action within the cylinder. Advantageously, the sealing rings are positioned so that the conical peripheries narrow toward the compression space of the cylinder. This allows the compressed gas to automatically center the piston, i.e., the several sealing rings, during operation.

In still another embodiment of the invention, a number of the slotted sealing rings are provided with peripheral sealing labyrinths in addition to the sealing rings with the conical peripheries. For instance, alternate sealing rings can have a conical periphery while the remaining sealing rings can have a peripheral labyrinth. In this embodiment, while the rings of conical periphery provide a guidance during centering of the piston under the influence of the gas, the labyrinth sealing rings assume most of the sealing action.

These and other objects and advantages of the invention will become more apparent from the following detailed description and appended claims taken in conjunction with the accompanying drawings in which:

FIG. 2 illustrates an enlarged view of the piston and cylinder of FIG. 1;

FIG. 3 illustrates a plan view of a slotted sealing ring according to the invention;

FIG. 4 illustrates a front view of the sealing ring of FIG. 3;

FIG. 5 illustrates a plan view of a closed ring element according to the invention;

FIG. 6 illustrates a front view of the ring element of FIG. 5;

FIG. 7 illustrates an enlarged fragmentary sectional view of the piston in a stationary inoperative position;

FIG. 8 illustrates a view similar to FIG. 7 of the piston in an operative position.

Figure 1:
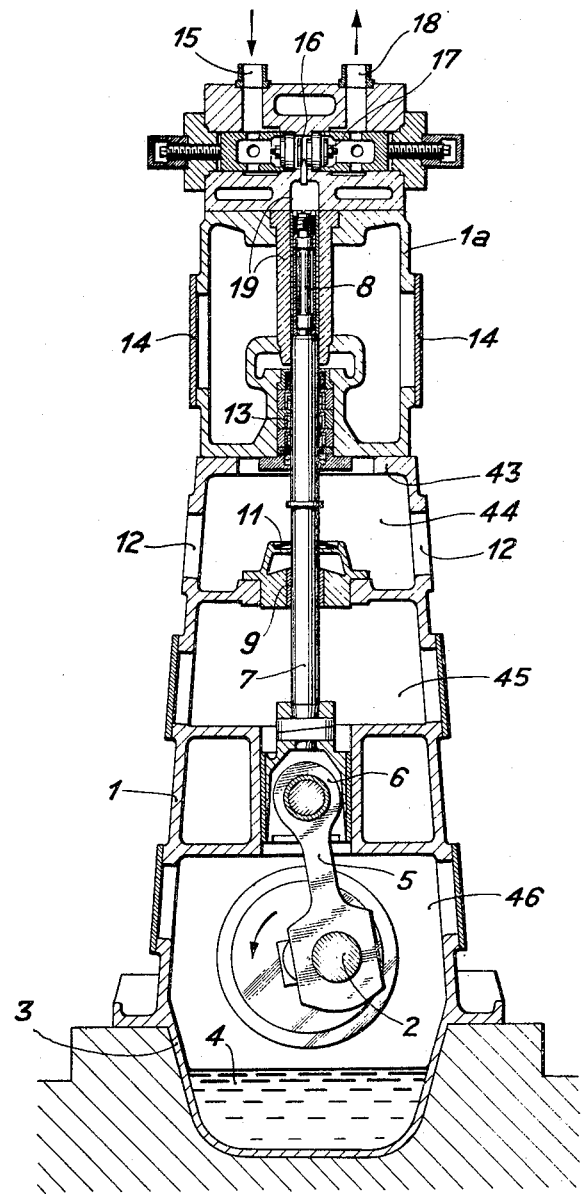
FIG. 1 illustrates a vertical sectional view through a single-stage single-acting compressor according to the invention.

Referring to FIG. 1, a compressor casing 1 of a reciprocating compressor machine receives a crank mechanism 2 within a crank case 3 containing a lubricant, such as, oil 4. The crank mechanism 2 operates a connecting rod 5, cross-head guide 6 and a piston rod 7 in a known manner to actuate a piston 8. The piston rod 7 is guided in a reciprocating manner by a lubricated sleeve guide bearing 9 as well as by the cross-head guide 6. In addition, an oil scraping assembly such as scraper rings 11 are provided above the guide bearing 9.

The casing 1 is formed with apertures 12 in the casing walls at the level of the scraper rings 11 as well as with a piston rod gland 13, for example, in the form of a number of graphite labyrinth rings, about the piston rod 7 above the scraper rings 11. The upper portion 1a of the casing 1 is sealed off from the surrounding environment in a gas-tight manner by closure members 14. A known assembly including a suction line 15, suction valve 16, delivery valve 17 and delivery line 18 is mounted over the upper portion 1a of the casing 1 to cooperate with a compression space 26 above and within a cylinder 19, for example, a cylinder insert, mounted in the upper casing portion 1a. The cylinder 19 surrounds the piston 8 and is spaced from the piston 8 with a slight clearance.

The compression casing 1 can be completely gastight at the bottom by, for example, closing the aperture 12, such that an intermediate pressure between the suction pressure and the final delivered pressure is produced in the part below the intermediate wall 43 during operation. The volume of gas disposed above the oil 4 in the casing chambers 44, 45 and in the crank chamber 46 thus has a buffering or gas bag action which is substantially not substituted in operation. The result is that substantially no oil mist from the lubricated parts 2, 6, 9 can rise as far as the piston 8 and the cylinder 19 and, therefore, cannot mix with the gas being conveyed.

Referring to FIGS. 2 and 7, the piston 8 is provided with a plurality of peripherally mounted sealing rings 22, 24 which project radially from the piston 8 towards the cylinder 19. The alternate sealing rings 22 are peripherally provided with labyrinths 23 while the other sealing rings 24 have peripheral conical portions 25 which narrow toward the compression space 26 of the cylinder 19. The conical portions 25 enable the gas, e.g. oxygen, ammonia, and the like, which is compressed in the compression space 26 to automatically center the piston 8 in operation.

Referring to FIGS. 3 and 4, each of the sealing rings 22, 24 is provided with an upstanding shoulder 29 along the inner edge as well as with a diagonally oriented transverse slot or gap 32. The slot 32 allows the sealing rings 22, 24 to expand radially, for example, under heat expansion.

Referring to FIGS. 2, 5 and 6, a number of closed ring elements 27 are mounted on the piston 8 in alternating fashion between each pair of adjacent sealing rings 22, 24. Each ring element 27 is sized with an outer diameter less than the outer diameters of the sealing rings 22, 24 so as not to obstruct the projection of the sealing rings 22, 24 from the piston 8. Also, each ring element 27 has a depending shoulder 28 at the outer edge which is disposed over the shoulder 29 of a sealing ring 22, 24 in mating relation. The shoulder 28 of the ring elements are of an inner diameter equal to or slightly greater than the respective outer diameters of the shoulders 29 of the sealing rings 22, 24 and serve to inhibit radial expansion of the slotted sealing rings 22, 24. Also, the respective shoulders 28 and sealing rings 22, 24 are relatively sized to prevent contact of the sealing rings with the cylinder 19 upon expansion of the sealing rings against the shoulder 29. Preferably, the sealing rings 22, 24 are made of a material, such as bronze, with a heat expansion rate greater than the elements 27 which are made of a material, such as steel. However, the sealing rings 22, 24 and ring elements 27 can also be made wholly or partly of a plastic, for example, Teflon.

The piston 8 has a pair of rings 53 mounted at the top and bottom which are each formed with a conical peripheral surface 51 and wearing grooves 52. The conical surfaces 51 serve to automatically center the piston 8 while the wearing grooves 52 ensure that, should the piston 8 touch the cylinder 19, the material being compressed has space to move into.

Referring to FIG. 7, in the stationary inoperative position of the machine, the slotted sealing rings 22, 24 are spaced with a slight axial clearance 30 from the upper ring elements 27 while the respective shoulders 28, 29 are spaced apart by a slight radial clearance 31 which is shown in exaggeration for sake of clarity.

The slots 32 in the sealing rings 22, 24 and the slight axial clearances 30 allow the pressure which is produced in the compression space 26 during operation to be propagated downwardly. Also, the slots 32 and clearances 30 permit the compressed gas from the compression space 26 to radially expand the sealing rings 22, 24. In addition, the piston 8 is disposed within the cylinder 19 in an eccentric manner such that the radial clearance 35 between the sealing rings 22, 24 and cylinder 19 on one side of the piston 8 is greater than the radial clearance 35a on the opposite side.

Referring to FIG. 8, in operation, the gas being conveyed reaches the inner walls 33 of the sealing rings 22, 24 via the slots 32 so that upon compression the gas forces the sealing rings to expand radially and thereby press the respective shoulders 29 against the shoulders 28 of the ring elements 27. As the shoulders 28 limit further expansion of the sealing rings 22, 24, the sealing rings are restrained from contact with the cylinder 19. During compression, the gas in the compression space 26 and between the piston 8 and cylinder 19 causes the piston 8 to automatically center itself concentrically to the cylinder such that a uniform minimum radial clearance 36 is caused to exist between the sealing rings 22, 24 and cylinder 19. The conical portions 25 of the sealing rings 22, 24 further ensure that the uniform clearance is brought about during operation of the piston 8. Further, the clearance 54 between the rings 53 and the cylinder 19 during operation is greater than the clearance 36 between the sealing rings 22, 24 and cylinder 19.

Alternatively, the sealing rings 22, 24 can be positioned within the ring elements 27 without a radial clearance 31 (FIG. 7). That is, the respective shoulders 28, 29 can be sized to fit within one another without any clearance or the sealing rings 22, 24 can be radially compressed initially and then inserted within the ring elements 27 so as to have an initial outward biasing prestress in the stationary position.

Figure 9:
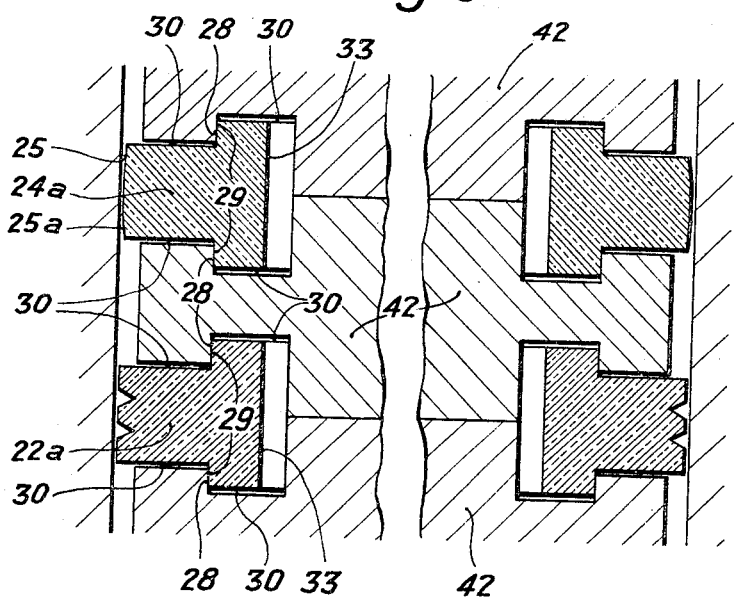
FIG. 9 illustrates a fragmentary sectional view of a modified double acting piston according to the invention.

Referring to FIG. 9, the piston 8' can alternatively be made up of a plurality of aligned parts 42 which are recessed to receive slotted sealing rings 22a, 24a which are provided with an annular shoulder 29 at top and bottom. Each part 42 is provided with an annular shoulder 28 at the top and bottom to mate with the respective shoulders 29 of the sealing rings 22a, 24a. Initially, the sealing rings 22a, 24a are received with a reduced axial clearance between each adjacent pair of piston parts 42 and under a slight biasing force between the mating shoulder 28, 29.

The piston 8' can be used in a double-acting reciprocating compressor such that during operation gas is forced against the walls 33 alternatively from a top or bottom compression space of the cylinder depending upon the direction of piston movement. In this case, the sealing rings 24a have a pair of conical portions 25, 25a of the periphery so that, during an upward stroke, gas from the top compression space acts on the rings 24a to aid in the centering of the piston 8' and, during a downward stroke, gas from the bottom compression space has a similar effect.

It is noted that the piston can be formed with two or more longitudinal dovetailed grooves to receive mating projections of the slotted sealing rings with a slight clearance in order to inhibit radial expansion of the sealing rings during operation.

It is also noted that all or some of the sealing rings and ring elements described above can be mounted on a piston in a reversed manner, i.e., upside down from that shown in FIG. 8. Also, the sequence of the sealing rings 22, 24 can be modified. For example, where a number of sealing rings 22, 24 are used, a large number of labyrinth rings 22 can be arranged adjacent each other with only a single sealing ring 24 with a conical peripheral portion 25 provided as the topmost sealing ring. Further, all or some of the sealing rings can be formed with a cylindrical periphery without conical portions or labyrinths.

The invention provides a reciprocating machine with a reciprocating piston which is spaced from a cylinder of a compression space with a reduced clearance. Experiments have shown that the clearance required for the piston can be reduced considerably without any seizing, for example, as a result of heat expansion, or abrasion on the sealing rings on their labyrinths since the sealing rings are under a inwardly directed resilient or biasing force.

The invention is also of use in reciprocating machines other than gas compressors in cases where the piston or, in a multi-stage machine, a number of consecutive pistons are required to run in a cylinder without contact and, if need be, to be automatically centered by the medium in the compression space 26 in operation. In such cases, excellent sealing-tightness is achieved by the use of slotted sealing rings whose widening is inhibited.

What is claimed is:
1. A reciprocating machine comprising
   a cylinder having a compression space therein,
   a piston within said cylinder in spaced radial relation thereto,
   at least one slotted sealing ring mounted around said piston in spaced relation to said cylinder, and
   means on said piston for limiting the tendency of said sealing ring to expand radially during operation of the machine under the pressure in the compression space of said cylinder.
2. A reciprocating machine as set forth in claim 1 wherein said sealing ring has a shoulder thereon and said means includes a shoulder in opposition to said shoulder of said sealing ring and being of a diameter at least equal to said shoulder of said sealing ring.
3. A reciprocating machine as set forth in claim 2 wherein said means is a closed ring element mounted on said piston.
4. A reciprocating machine as set forth in claim 1 wherein at least a portion of the peripheral surface of said sealing ring is conical.
5. A reciprocating machine as set forth in claim 4 wherein said conical portion narrows in a direction towards the compression space of said cylinder.
6. A reciprocating machine as set forth in claim 1 wherein said sealing ring has a peripheral sealing labyrinth.
7. A reciprocating machine as set forth in claim 1 further comprising a ring fixedly mounted on said piston and having a conical peripheral surface portion thereon to facilitate centering of said piston in said cylinder during operation.
8. A reciprocating machine as set forth in claim 1 comprising a plurality of said sealing rings, at least one of said sealing rings having a conical surface on a portion of the peripheral surface thereof.
9. A reciprocating machine as set forth in claim 8 wherein alternating rings have peripheral sealing labyrinths.
10. A reciprocating machine as set forth in claim 8 wherein alternating rings have at least one conical surface on the peripheral surface thereof.

References Cited

UNITED STATES PATENTS

| | | | |
|---|---|---|---|
| 2,566,994 | 9/1951 | Phipps | 92—258 X |
| 3,277,797 | 10/1966 | Tyree et al. | 92—257 X |
| 3,316,817 | 5/1967 | Ellis | 92—253 X |
| 3,343,461 | 9/1967 | Tinsley | 92—258 X |
| 3,353,456 | 11/1967 | Bauer | 92—258 |

CARROLL B. DORITY, Jr., Primary Examiner

U.S. Cl. X.R.

92—258